(12) United States Patent
Giang et al.

(10) Patent No.: US 9,046,264 B2
(45) Date of Patent: Jun. 2, 2015

(54) METHOD OF CONTROLLING BURNERS FOR HEATING LIQUID GLASS FLOW CHANNELS

(75) Inventors: Son-Ha Giang, Sucy en Brie (FR); Luc Jarry, Meudon (FR); Gerard Le Goueffllec, Velizy (FR); Dominique Robillard, Versailles (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1504 days.

(21) Appl. No.: 12/251,937

(22) Filed: Oct. 15, 2008

(65) Prior Publication Data

US 2009/0053658 A1 Feb. 26, 2009

Related U.S. Application Data

(62) Division of application No. 10/556,666, filed as application No. PCT/FR2004/001124 on May 7, 2004.

(30) Foreign Application Priority Data

May 13, 2003 (FR) ...................................... 03 05735

(51) Int. Cl.
| | |
|---|---|
| *F23L 9/00* | (2006.01) |
| *F23D 14/32* | (2006.01) |
| *F23D 14/78* | (2006.01) |
| *F23N 3/00* | (2006.01) |
| *F23N 5/18* | (2006.01) |
| *C03B 5/173* | (2006.01) |
| *C03B 7/06* | (2006.01) |

(52) U.S. Cl.
CPC ................ *F23D 14/32* (2013.01); *F23D 14/78* (2013.01); *F23N 3/002* (2013.01); *F23N 5/184* (2013.01); *C03B 5/173* (2013.01); *C03B 7/065* (2013.01); *F23L 2900/07003* (2013.01); *F23L 2900/07006* (2013.01); *F23L 2900/07007* (2013.01); *F23N 2005/181* (2013.01); *F23N 2037/26* (2013.01); *Y02E 20/344* (2013.01); *Y02T 50/677* (2013.01)

(58) Field of Classification Search
USPC .............. 431/2, 181, 10, 187, 190, 186, 188, 431/353, 350; 239/44, 406
See application file for complete search history.

(56) References Cited

U.S. PATENT DOCUMENTS

| | | | |
|---|---|---|---|
| 3,615,213 A | * | 10/1971 | Shepherd ...................... 423/450 |
| 5,145,361 A | | 9/1992 | Kurzinski |
| 5,500,030 A | | 3/1996 | Broadway et al. |

(Continued)

FOREIGN PATENT DOCUMENTS

| | | |
|---|---|---|
| DE | 201 06 097 | 8/2001 |
| EP | 0 877 203 | 11/1998 |

OTHER PUBLICATIONS

International Search Report for PCT/FR2004/001124.

*Primary Examiner* — Avinash Savani
(74) *Attorney, Agent, or Firm* — Christopher J. Cronin

(57) ABSTRACT

Methods and apparatus for controlling the operation of a burner used for heating liquid glass feeders of a glass furnace. A burner is supplied with a fuel and oxygen. An additional gas is injected so that the sum of the oxygen flow, the fuel flow and the additional gas flow is greater than a minimum cooling flow for the burner.

11 Claims, 2 Drawing Sheets

(56) References Cited

U.S. PATENT DOCUMENTS

| | | | |
|---|---|---|---|
| 5,891,404 A * | 4/1999 | Ibaraki et al. | 422/182 |
| 5,904,475 A * | 5/1999 | Ding | 431/8 |
| 6,200,128 B1 * | 3/2001 | Kobayashi | 431/5 |
| 6,283,747 B1 * | 9/2001 | Legiret et al. | 432/12 |
| 6,431,467 B1 * | 8/2002 | Joshi et al. | 239/404 |
| 6,582,218 B1 * | 6/2003 | D'Agostini et al. | 431/181 |

* cited by examiner

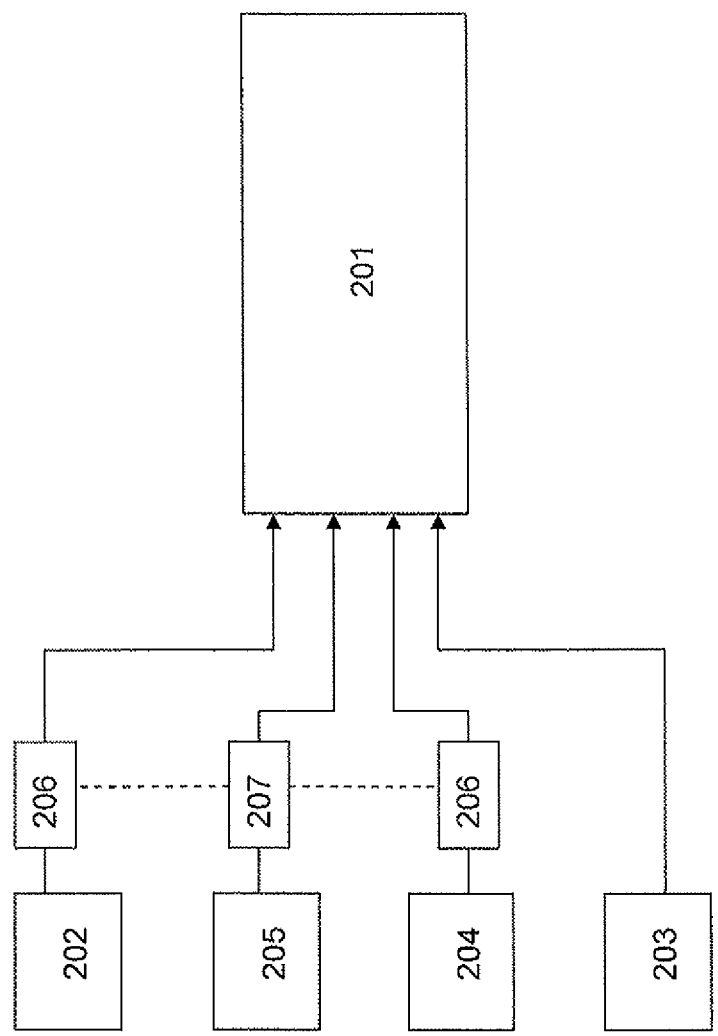

METHOD OF CONTROLLING BURNERS FOR HEATING LIQUID GLASS FLOW CHANNELS

CROSS-REFERENCE TO RELATED APPLICATIONS

This present application is a division application of U.S. application Ser. No. 10/556,666 filed Nov. 10, 2005 which is a §371 of PCT/FR04/01124 filed May 7, 2004, which claim priority from French Patent Application No. FR 0305735 filed May 13, 2003.

BACKGROUND

The present invention relates to a method of controlling the operation of a burner for heating the liquid glass feeders coming from a glass furnace.

In a continuous glass manufacturing line, the glass is melted in relatively large capacity furnaces that deliver molten glass as output. In certain industrial furnaces, such as glass furnaces for hollowware, the molten glass must be conveyed right to the glass-forming machines. To transport this molten glass, "feeders" or "forehearths" lined with refractory materials are used. As the glass is being conveyed in this way, it is cooled and also conditioned so that, on leaving the feeders, its temperature is perfectly stable and homogenous to within ±1° C. To achieve this, the temperature of the glass leaving the feeders must therefore be constant but also perfectly uniform transversely, that is to say over the width of each feeder.

It is essential to control the heat transfer method at the surface of the glass over the entire length of the feeder in order to reduce the output temperature gradient. To do this, it is common practice to equip the feeders with a heating device, which heats by combustion of an air/combustible gas mixture above the free surface of the stream of molten glass. This combustion is obtained using air/fuel burners. While the molten glass is flowing, in order for the temperature of the molten glass to be both lowered and homogenized, series of burners are distributed over the entire path of the molten glass. Owing to the number of burners and the difficulty of detecting and controlling the volumes of flue gases that they create, the combustion may be carried out by burners whose oxidizer is cold air; now, these burners have a generally mediocre efficiency and offer little flexibility as regards obtaining a good transverse thermal profile.

To solve these problems, the combustion of an air/combustible gas mixture has been replaced with combustion of an oxygen/combustible gas mixture using oxyfuel burners. This modification has increased the glass production capacity, and also the combustion efficiency and radiative transfer. Such burners have been described, for example, in Documents U.S. Pat. No. 6,431,467 and U.S. Pat. No. 5,500,030. These burners have in particular the advantage of providing a large operating range, that is to say the possibility of varying the power—and therefore the fuel and oxidizer flow rates—much more widely than in the case of air/fuel burners. Furthermore, the length of the flame of these burners is constant over their entire operating range. This property allows them to heat the edge of the feeders, at the point where the glass cools upon contact with the refractories. They also limit the thermal gradient, and therefore the difference in viscosity, between the core of the feeder and the edges; thus preferential flow of the glass at the centre of the feeder is limited. Moreover, the heating power for a section of feeder by oxyfuel combustion or with oxygen-enriched air is greater than that which can be achieved in air/fuel combustion. The wide power range within which the oxyfuel burners operate allows dynamic regulation which rapidly compensates for the variations in the process and stabilize the glass temperature. The feeders may be equipped over their entire length with several heating zones; in this case, the oxyfuel burners provide great operating flexibility thanks to greater precision in the temperature regulation. If the entire length of the feeder is fitted with oxyfuel burners, this operating flexibility is even greater. Furthermore, the gas consumption is reduced. Oxyfuel burners also allow the volume of flue gases to be reduced, which may in certain cases lead to a reduction in the fly-off and volatilization of certain components conveyed in the feeders, such as pigments.

However, this oxyfuel combustion may have certain drawbacks. Firstly, the flame geometry of the feeder burners is particularly important as it is necessary to ensure that the glass stream heating profile is particularly stable and uniform. However, the thermal behaviour of the materials that make up the self-cooled oxyfuel burners is generally difficult since the ambient temperature therein is generally high, whereas the gas and oxygen flow rates in each burner are low (low unit power). Thus, to ensure a stable flame profile, there is not as much operating flexibility for these burners as the oxyfuel would allow. In addition, the low-speed flow of the burners may be the source of burner failures requiring maintenance. This is because the burners are cooled by convection with the flow of both the oxidizer and the fuel that they use. In the case of combustion with oxygen, the flow volume is about 70% less than that of combustion with air. The cooling is therefore less effective for the same power. The combustion flame with oxygen is also hotter and more radiating. In addition, at low power, the heating of the burner end-fitting may cause premature cracking and therefore as a consequence rapid fouling and premature wear of the burner. Finally, the feeders must always be at an overpressure, and this pressure is maintained by the volume of the burner flue gases. In aerocombustion, this volume is stabilized—a set of flue gas discharge dampers allows the pressure to be adjusted, which it is necessary to monitor and regulate. In oxycombustion, the volume of flue gases is much lower, and in addition, varies greatly with the power, thereby making it difficult to control the pressure in the feeders. A pressure-stable method independent of the instantaneous power conditions is therefore sought.

SUMMARY

The invention includes both methods and apparatus to achieve the desired results, as described, but is not limited to the various embodiments disclosed. It is an object of the present invention to propose a method of heating glass feeders using oxyfuel burners that does not have the above drawbacks.

It is an object of the present invention to propose a method of heating glass feeders using oxyfuel burners that is flexible and can be easily modified.

For this purpose, the subject of the invention is a method for controlling the operation of a burner for heating the liquid glass feeders coming from a glass furnace, the said burner being fed with a combustible gas and with oxygen, in which an additional gas is injected as a complement to the oxygen so that the sum of the additional gas, oxygen and combustible gas flow rates is greater than or equal to the minimum flow rate $D_{MIN}$ for cooling the burner.

BRIEF DESCRIPTION OF THE DRAWINGS

For a further understanding of the nature and objects for the present invention, reference should be made to the following detailed description, taken in conjunction with the accompanying drawing, in which like elements are given the same or analogous reference numbers and wherein:

FIG. 2 is a schematic of a combustion system according to the invention.

DESCRIPTION OF PREFERRED EMBODIMENTS

Figure 1:
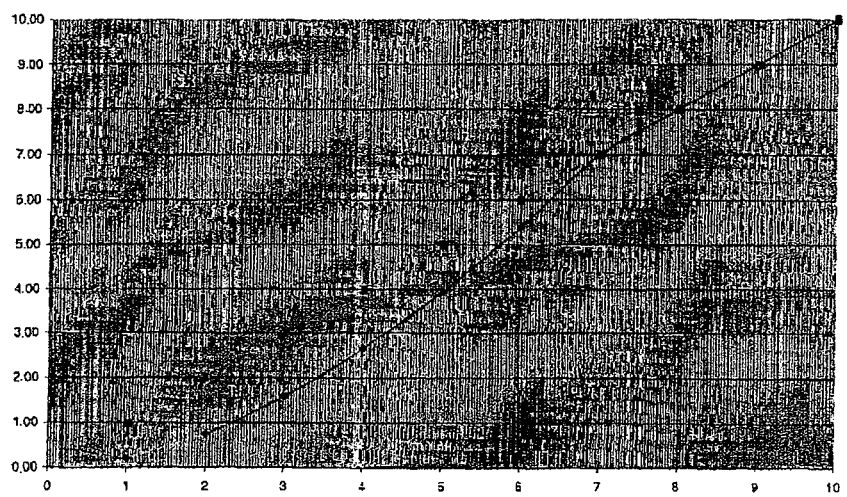
FIG. 1 illustrates a graphical representation of the power ranges obtained by conventional methods and by one embodiment of the current invention.

The invention includes methods and apparatus for controlling the operation of a burner for heating liquid glass feeders coming from a glass furnace, as described above.

The invention also relates to a combustion system comprising:
- an oxyfuel burner 201;
- a means for feeding the burner with fuel 202;
- a means for feeding the burner with oxidizer 203, cooperating with an oxygen feed means 204 and an additional gas feed means 205;
- a means for measuring the flow rate of at least the oxygen or the fuel 206; and
- a means for controlling the additional gas flow rate 207.

Finally, the invention relates to the use of the above system for heating the liquid glass feeders coming from a glass furnace.

Other features and advantages of the invention will become apparent on reading the following description. Embodiments of the invention and methods of implementing it are given by way of non-limiting examples illustrated by FIG. 1, which shows the range of power levels obtained with the method and the system according to the invention and with the method of the prior art.

The invention therefore firstly relates to a method for controlling the operation of a burner for heating the liquid glass feeders coming from a glass furnace, the said burner being fed with a combustible gas and with oxygen, in which an additional gas is injected as a complement to the oxygen so that the sum of the additional gas, oxygen and combustible gas flow rates is greater than or equal to the minimum flow rate $D_{MIN}$ for cooling the burner.

The invention therefore allows the operation of an oxyfuel burner to be controlled. The term "oxyfuel burner" is understood to mean a burner implementing oxycombustion obtained by mixing a fuel with oxygen. The term "oxygen" is understood to mean an oxygen-containing gas comprising more than 90% by volume of oxygen. The oxygen produced by a VSA (vacuum swing adsorption) process is particularly suitable. According to the essential feature of the invention, an additional gas is injected into the burner as a complement to the oxygen. In general, the additional gas is mixed with oxygen before it is brought into contact with the fuel, for example in a premixing chamber. The amount of additional gas injected as a complement to the oxygen and to the fuel allows the operation of the burner to be controlled according to the following rule: the sum of the additional gas, oxygen and combustible gas flow rates must be greater than the minimum flow rate $D_{MIN}$ for cooling the burner. The value of $D_{MIN}$ may be set for each type of burner according to the flow rate of the fuel introduced into the burner. More precisely, the value of $D_{MIN}$ may be set in the following manner: $D_{MIN}$ must be sufficient to cool the burner. This flow rate value needed for cooling is specific to the burner used; it can be determined by a person skilled in the art according to the withstand temperature of the said burner. This burner withstand temperature is itself determined beforehand by tests. In practice, the additional gas flow rate may be controlled by a pressure regulator inserted into the line for delivering oxygen to the burner and regulated so as to deliver a stream of oxygen and additional gas at defined pressure. This pressure is set so as to correspond to the minimum gas flow rate needed to cool the burner. Thus, if the oxygen flow rate varies following a variation in fuel flow rate, and so as to maintain a fixed combustible gas/oxygen stoichiometric ratio, the additional gas flow rate also varies in order to compensate or not compensate for the variation in oxygen flow rate in the burner.

According to a first further improved version of the method, it is possible to vary the additional gas flow rate according to the oxygen and combustible gas flow rates by permanently measuring the latter two flow rates and by adjusting the additional gas flow rate so that the sum of the oxygen, additional gas and fuel flow rates is greater than $D_{MIN}$.

According to a second, simplified, particular version of the invention, all that is required is to ensure that the sum of the additional gas and oxygen flow rates is greater than or equal to the minimum flow rate $D_{MIN}$ for cooling the burner. A fortiori, the sum of the additional gas, oxygen and combustible gas flow rates is also greater than the minimum flow rate $D_{MIN}$ for cooling the burner. This particular method of implementation is simpler since it is now a question merely of slaving the additional gas flow rate to the measurement of the oxygen flow rate, for example by means of a simple pressure regulator, without taking into account the value of the combustible gas flow rate.

According to the invention, the additional gas may be an oxidizer gas different from oxygen, or a gas that is inert with respect to fuel. It is preferably at least one of the following gases: air, carbon dioxide, argon, helium, nitrogen or a mixture of these gases. Air is generally best suited owing to its low cost and its composition. An additional gas composed of a quantity of oxygen of around 21% by volume and of at least one other gas different from oxygen is beneficial as, on the one hand, it is favourable to combustion and, on the other, the quantity of oxygen that it introduces may be deducted from the main oxygen injected for burning the fuel.

During a variation in the power of the burner, the fuel and oxygen flow rates increase or decrease proportionally so as to maintain a constant predefined stoichiometric ratio. Depending on the value of the oxygen flow rate used, the additional gas is added as a complement to the oxygen so that the total flow rate of oxygen and additional gas is greater than or equal to $D_{MIN}$. Consequently, the burner does not suffer any low-power deterioration since, despite the injection of oxygen and fuel at low flow rates, the additional gas provides the gas volume needed to cool the burner. This additional gas also prevents the burner end-fitting becoming fouled by glass deposits and prevents it from being damaged. Furthermore, the additional gas creates a volume of flue gases that allows the operator to obtain and control the overpressure within the feeders. At high power, the additional gas flow rate may optionally be reduced to zero in order to allow operation only with oxygen. In this case, the sum of the oxygen and the combustible gas flow rates is greater than $D_{MIN}$.

According to a first preferred version of the method, this uses a burner of the type described in U.S. Pat. No. 5,500,030. More particularly, this type of burner comprises:
- a first duct for passage of the oxygen;
- a second duct, coaxial with the first duct and placed inside the said first duct, for passage of the fuel.

It is preferable for the end of the second duct to be placed set back from the end of the first duct. More preferably, burners of this type are used in which the ratio of the inside diameter of the first duct to the inside diameter of the second duct is between 2/1 and 8/1.

According to a second preferred version of the method, this uses a burner of the type described in U.S. Pat. No. 6,431,467. More particularly, this type of burner comprises:
- a first duct for passage of the oxygen;
- a second duct, coaxial with the first duct and placed inside the said first duct, for passage of the fuel;
- an end-fitting placed at the end of the first duct;
- a nozzle placed at the end of the second duct;
- a means for making the fuel swirl, placed on the nozzle at the end of the second duct. According to this second version, the means for making the fuel swirl comprises an object of elongate shape centred aerodynamically inside the nozzle of the second duct, the inside diameter of the said nozzle being greater than the diameter of the object of elongate shape of the means for making the fuel swirl. The object of elongate shape of the means for making the fuel swirl may consist of at least one helical rod over a portion of its length. This burner may also include a means for making the oxidizer swirl, placed on the end-fitting at the end of the first duct; this means for making the oxidizer swirl may consist of a helical spring. This type of burner is particularly suitable for implementing the method of the invention because it produces a flame of constant length independently of the power variations.

The invention also relates to a system comprising:
- an oxyfuel burner;
- a means for feeding the burner with fuel;
- a means for feeding the burner with oxidizer, cooperating with an oxygen feed means and an additional gas feed means;
- a means for measuring the flow rate of at least the oxygen or the fuel; and
- a means for controlling the additional gas flow rate.

This combustion system allows the variations in power of the burner to be finely controlled without the drawbacks encountered in this type of burner. Such a system allows the method of controlling the operation of the oxyfuel burner, as described above, to be implemented. In general, the means of controlling the additional gas flow rate is slaved to the means of measuring the flow rate of at least the oxygen or the fuel. This means of controlling the additional gas flow rate may be a pressure regulator or a servovalve, that is to say a valve slaved to a control value. When the means of controlling the additional gas flow rate is a pressure regulator, all that is required is to regulate it so as to deliver the additional gas until the pressure generated by this additional gas and the oxygen that is delivered is greater than the pressure needed to obtain the minimum oxidizer flow rate $D_{MIN}$. When the means of controlling the additional gas flow rate is a servovalve, and is possible to slave the opening of the additional gas feed means to one of the following control values: the oxygen flow rate or the fuel flow rate, taking into account the fixed oxygen/fuel stoichiometric ratio. According to one particular method of implementation, in which the additional gas is air, the servovalve may take into account the supply of oxygen from the air in calculating the oxygen/fuel stoichiometric ratio; this method of implementation makes it possible to economize on consumption of oxygen.

Finally, the invention relates to the use of the above system for heating the liquid glass feeder channels coming from a glass furnace.

The graph shown in FIG. 1 illustrates the power ranges obtained with the method and the system according to the invention and with the method according to the prior art. In the case of the system according to the invention (solid curve) and the oxyfuel burner according to the prior art (dotted curves of the . . . . . and . - . - . - type), the curves give the power (in kW) that it is possible to transfer as a function of the developed power (in kW). The developed power is the power created by the stoichiometric combustion using an oxidizer comprising only oxygen. The transferred power is the power that is actually transferred to the glass. In the case of oxycombustion using an oxidizer comprising only oxygen (oxyfuel burner according to the prior art), it may be seen that the transferred power corresponds to the developed power. For combustion using an oxidizer comprising oxygen and the additional gas, although the same power is developed as with the burner of the prior art, it may be seen that the power transferred by the burner implementing the invention may be lower, on account of the power losses due to the volumes of flue gases in a certain power range. It has been observed that the burner according to the prior art is limited to operation, in terms of transferred power and developed power, within the 7 to 10 kW range since below 7 kW the burner cannot operate without suffering deterioration by the absence of a sufficient gas stream (deterioration in the range defined by the dotted curve of the . . . . type). Thanks to the system according to the invention, this same burner may have its operating range broadened to 0.15 to 10 kW. It may also be emphasized that the method and the device according to the invention make it possible to broaden the operating range of the burners of the prior art within a power range that was not accessible in the prior art, even by making them operate in the power range causing them to deteriorate, and that corresponds to the dotted curve of the . . . . . type in FIG. 1; it may be seen that this "deteriorating" power range cannot drop below 1 kW of transferred power, whereas the method according to the invention allows access to transferred power levels between 0.15 and 1 kW.

By implementing the method and the system according to the invention, it is possible to heat the molten glass feeders coming from a glass furnace while maintaining the advantages of oxyfuel burners—namely a broader operating range than for air/gas burners, again for high power levels, optionally controlled flame length and reduction in fuel consumption—while improving the low-power heating profile without the burner deteriorating.

The invention also has the advantage that a stable pressure can be maintained in the feeders because of a flue gas volume that is higher than during low-power all-oxygen combustion.

Owing to the possibility of working with low-power burners, the invention also makes it possible to work with a larger number of burners operating at lower power levels—the heating may thus be more uniform and the quality of the transfer to the glass is improved.

In addition, although the complementary injection of additional gas into the oxygen degrades the combustion efficiency, it does allow, however, the power transferred to the glass to be very finely regulated.

The combustion efficiency is a minimum when the burners operate at low power. However, at these levels the fuel saving is potentially lower. This method has little impact on the economics.

Another advantage of the invention is that it allows the power of the burner to be rapidly adjusted according to the nature of the glass flowing through the feeders. This advantage is more particularly important at the present time because of the continual modifications made to glasses produced in order to follow the fashion trends (colours, etc.).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for controlling a burner for heating liquid glass feeders of a glass furnace, said method comprising:
    a) feeding at least one burner with a combustible gas and oxygen;
    b) injecting an additional gas as a complement to said oxygen; and
    c) controlling a flow rate of the injected additional gas, wherein the flow rate of the additional gas is slaved to a flow rate of the oxygen or the combustible gas such that the sum of the flow rates for said combustible gas, said oxygen, and said additional gas is greater than or equal to a minimum flow rate $D_{MIN}$ for cooling the burner, wherein $D_{MIN}$ is the minimum flow rate through the burner required for cooling the burner during combustion so as to prevent structural thermal damage to the burner.

2. The method of claim 1, wherein said additional gas comprises at least one member selected from the group consisting of:
    a) air;
    b) carbon dioxide;
    c) argon;
    d) helium; and
    e) nitrogen.

3. The method of claim 1, further comprising mixing said additional gas and said oxygen prior to introducing said combustible gas.

4. The method of claim 1, wherein said minimum flow rate $D_{MIN}$ is set according to the flow rate of said combustible gas.

5. The method of claim 1, wherein the sum of the flow rates for said additional gas and said oxygen is greater than or equal to said minimum flow rate.

6. The method of claim 1, wherein said burner comprises:
    a) a first duct for the passage of said oxygen, said first duct having an inlet end and an outlet end;
    b) a second duct for the passage of said combustible gas, the second duct having an inlet end and an outlet end, wherein:
        1) said second duct is coaxially located substantially inside of said first duct; and
        2) said second duct's outlet end is located back from said first duct's outlet end.

7. The method of claim 1, wherein said burner comprises:
    a) a first duct for the passage of said oxygen, said first duct having an inlet end and an outlet end;
    b) a second duct for the passage of said combustible gas, wherein said second duct has an inlet end and an outlet end and is coaxially located substantially inside of said first duct;
    c) an end-fitting located at said first duct's outlet end;
    d) a nozzle located at said second duct's outlet end; and
    e) a combustible gas swirler located at said second duct's outlet end adapted to cause said combustible gas to move in a swirling manner.

8. The method of claim 7, wherein:
    a) said combustible gas swirler comprises an object of elongated shape which is centered aerodynamically within said nozzle; and
    b) said nozzle has an inside diameter which is greater than the diameter of said object of elongated shape.

9. The method of claim 8, wherein:
    a) said object of elongated shape comprises at least one helical rod; and
    b) said helical rod is located over a portion of said object's length.

10. The method of claim 7, wherein said burner comprises an oxygen swirler located on said end-fitting.

11. A method for controlling a burner for heating liquid glass feeders of a glass furnace, said method comprising:
    a) feeding at least one burner with a combustible gas and oxygen, wherein said burner comprises:
        1) a first duct for the passage of said oxygen, the first duct having an inlet end and an outlet end;
        2) a second duct for the passage of said combustible gas, wherein said second duct is coaxially located substantially inside of said first duct, the first duct having an inlet end and an outlet end;
        3) an end-fitting located at said first duct's inlet end;
        4) a nozzle located at said second duct's inlet end; and
        5) a combustible gas swirler, located at said second duct's inlet end, to cause said combustible gas to move in a swirling manner;
    b) injecting an additional gas as a complement to said oxygen; and
    c) controlling a flow rate of the injected additional gas, wherein the flow rate of the additional gas is slaved to the flow rate of the combustible gas or oxygen such that the sum of the flow rates for said combustible gas, said oxygen, and said additional gas is greater than or equal to a minimum flow rate $D_{MIN}$ for cooling the burner, wherein said additional gas is mixed with said oxygen prior to introducing said combustible gas.

* * * * *